US006760713B2

(12) United States Patent
Beier et al.

(10) Patent No.: US 6,760,713 B2
(45) Date of Patent: Jul. 6, 2004

(54) METHOD, COMPUTER PROGRAM PRODUCT, AND SYSTEM FOR FILE AND RECORD SELECTION UTILIZING A FUZZY DATA RECORD POINTER

(75) Inventors: Harley A. Beier, San Martin, CA (US); Dean Lynn Grover, Hollister, CA (US); Claudia Si-man Ho, San Jose, CA (US); Percy Tzu-jung Li, Morgan Hill, CA (US); Vern Lee Watts, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 09/849,861

(22) Filed: May 3, 2001

(65) Prior Publication Data

US 2002/0165625 A1 Nov. 7, 2002

(51) Int. Cl.[7] .............................. G06F 15/18; G06F 9/44
(52) U.S. Cl. ............................................. 706/7; 706/52
(58) Field of Search ........................................ 706/7, 52

(56) References Cited

U.S. PATENT DOCUMENTS

| | | | |
|---|---|---|---|
| 4,797,812 A | 1/1989 | Kihara | 710/26 |
| 5,581,750 A | 12/1996 | Haderle et al. | 707/202 |
| 5,721,915 A | 2/1998 | Sockut et al. | 707/200 |
| 6,026,412 A | 2/2000 | Sockut et al. | 707/200 |

FOREIGN PATENT DOCUMENTS

JP        59172051        9/1984

OTHER PUBLICATIONS

Arabshahi et al. "Pointer Adaptation and pruning of Min—Max Fuzzy Inference and Estimation," IEEE Transactions on Circuits and Systems, Sep. 1997.*
Heronimus, Scott, *Dynamic DEDB Extensions—Product Review: Fast Path Reorg/EP™* vol. 8, Issue 1, Feb. 2000 Excerpt from http://www.bmc.com/technews/001/dynamic.html.

* cited by examiner

*Primary Examiner*—George B. Davis
(74) *Attorney, Agent, or Firm*—Gregory M. Plow (57) ABSTRACT

A fuzzy data record pointer is utilized for identification of both a target file and a target data record within the target file. A target data record is accessed from a target file, selected from a set of N related files, utilizing a fuzzy data record pointer ("fuzzy", as used herein, means that the data record pointer need not be coincident with the actual data record address). A modulus for the data record pointer divided by N is computed. This modulus is used to select the target file. A data record address is computed for the target data record utilizing the data record pointer and modulus. In this manner a fuzzy data record pointer is utilized to determine both the target file from a set of N related files and the target data record to be accessed within the target file.

29 Claims, 6 Drawing Sheets

METHOD, COMPUTER PROGRAM PRODUCT, AND SYSTEM FOR FILE AND RECORD SELECTION UTILIZING A FUZZY DATA RECORD POINTER

FIELD OF INVENTION

The present invention relates to managing data on computer systems. More specifically, the present invention relates to the retrieval, insert or update of data records from a particular file within a set of related files.

BACKGROUND

Data managed by data processing systems is growing at a phenomenal rate. This is due to many factors including the trend of placing new types of data under the control of computers, such as e-mail, multimedia, photos, music and video, as well as the proliferation of data generated by the mass migration of new applications to the Internet In addition, there is typically a need for data owners to retain and preserve data for long periods of time, if not indefinitely. Accordingly, this explosion of new data is typically not displacing other data but is generally cumulative to most of the data previously generated.

Another form of data growth is due to the creation of multiple related files where each related file within a set of related files contains information related to, or corresponding to, information in other files within the set of related files. These additional related files are motivated from one of several possible needs. First, data records in a file may need to be rearranged to achieve a physical clustering of the data records that are frequently accessed together. These data records may have been physically clustered together initially, but as new data records are inserted and existing data records are deleted or updated, the adjacency characteristic may be greatly diminished over time. Reorganizing these data records, by physically clustering them close together, will minimize hardware delays when these records are retrieved together thereby achieving enhanced Input/Output (I/O) performance and improved response time for the user of the data processing system.

Typically, this type of reorganization may take long periods of time and users of the data processing system may not be able to wait for this operation to complete before accessing needed data records. Therefore, advanced data processing systems may provide for concurrent access to data simultaneous with a data reorganization operation. To achieve this feature, data records may be replicated from one file to a related file such that during the reorganization operation two related files exist and serve to satisfy data access requests during the ongoing reorganization. Multiple related files may exist for other reasons as well. Another example of utilizing multiple related files is multiple version support. When data records are updated, it is sometimes required that the previous versions of the record be made available for access as well as the most recently created version. Multiple related files may be used to achieve this type of functionality as well. Prior art data processing systems create an additional index for each related file such that each file in the set of related files has its own independent index. Alternatively, prior art computer systems may use a single index; however, in this case the single index is comprised of index entries that include additional information in order to identify a particular one of a set of related files to be used.

Exponential rates of data growth present problems related to storage capacity and performance. Users of computer systems demand timely responses to their queries, independent of whether there are a few thousand data records or billions of data records. Frequently hardware capabilities within an enterprise lag behind these user requirements placing an ever larger burden upon the software engineer to stretch the capabilities of the enterprise's hardware resources. Accordingly, computer software engineers look for ways to use the hardware capacity of existing storage devices as efficiently as possible. Example storage devices include magnetic disk, magnetic tape, electronic flash memory, optical devices, etc. Many techniques are known in the art for extending the logical capacity of storage devices. For example, data compression algorithms such as Lempel Ziv Welch (LZW) are commonly used to increase the amount of data that can be stored on a fixed capacity storage device. Indexes stored on storage devices are also compressed by utilizing various algorithms to compress each key field within the index. These and many other algorithms and programming techniques are known in the art for increasing the logical capacity and improving the performance characteristics of various storage devices; however, to keep pace with insatiable storage demands, even more techniques are needed.

Indexes are of special significance to a software engineer because, in addition to consuming space on a storage device, they are closely tied to the performance capabilities achievable by a given data processing system. For example, if each index entry within an index is consuming extra space, then that index may increase in the number of index levels. Indexes are typically hierarchical tree structures and the number of index levels refers to the number of levels within the index hierarchy beginning with the root node and ending with the final leaf node. Searching an index to find a specific data record typically involves reading one index record from each level of the index, so extra index levels within the index may result in a significant degradation of performance during searching operations of the data processing system.

Accordingly there is a need for even more innovative ways for an enterprise to cope with exploding data growth. In an environment where multiple related files are present, it is desirable to increase logical data storage capacity by providing additional software solutions for storing more data in the same amount of space. It is highly desirable to eliminate extra indexes for related files such that a single index is utilized, thereby substantially reducing the space used for the collection of all related files. Further, there is a need to enhance search performance and reduce user response time in this environment by minimizing the size of index entries within an index and, accordingly, minimizing the number of index levels to be traversed during search operations.

SUMMARY OF THE INVENTION

To overcome the limitations in the prior art briefly described above, the present invention provides a method, computer program product, and system for utilizing storage efficiently, and improving search performance, in an environment comprising a plurality of related files. Specifically, the invention utilizes a fuzzy data record pointer ("fuzzy", as used herein, means that the data record pointer need not be coincident with the actual data record address) for identification of both a target file and a target data record within the target file.

A target data record is accessed from a target file, selected from a set of N related files, utilizing a fuzzy data record pointer (hereinafter referred to as data record pointer). A modulus, for the data record pointer divided by N, is computed. This modulus value is utilized to select the target file. The data record pointer and modulus is also used to compute a data record address for the target data record.

In this manner a data record pointer is utilized to determine both the target file from a set of N related files and the target data record within the target file to be accessed. This novel technique facilitates the use of a single index for searching a plurality of related files. Further, individual index entries within the index are not expanded to accommodate the additional target file identification information. Accordingly, computer storage is used more efficiently and search performance is improved.

Various advantages and features of novelty, which characterize the present invention, are pointed out with particularity in the claims annexed hereto and form a part hereof. However, for a better understanding of the invention and its advantages, reference should be made to the accompanying descriptive matter, together with the corresponding drawings which form a further part hereof, in which there is described and illustrated specific examples of preferred embodiments in accordance with the present invention.

BRIEF DESCRIPTION OF THE DRAWINGS

The preferred embodiments of the present invention will hereinafter be described in conjunction with the appended drawings, where like reference numbers denote the same element throughout the set of drawings.

DESCRIPTION OF THE PREFERRED EMBODIMENTS

The preferred embodiment in accordance with the present invention is directed to a system, computer program product, and method for utilizing storage efficiently and improving index performance in an environment comprising a plurality of related files. The following description is presented to enable one of ordinary skill in the art to make and use the present invention and is provided in the context of a patent application and its requirements. Various modifications to the preferred embodiment will be readily apparent to those skilled in the art and the teaching contained herein may be applied to other embodiments. Thus, the present invention should not be limited to the embodiments shown but is to be accorded the widest scope consistent with the principles and features described herein.

Figure 1:
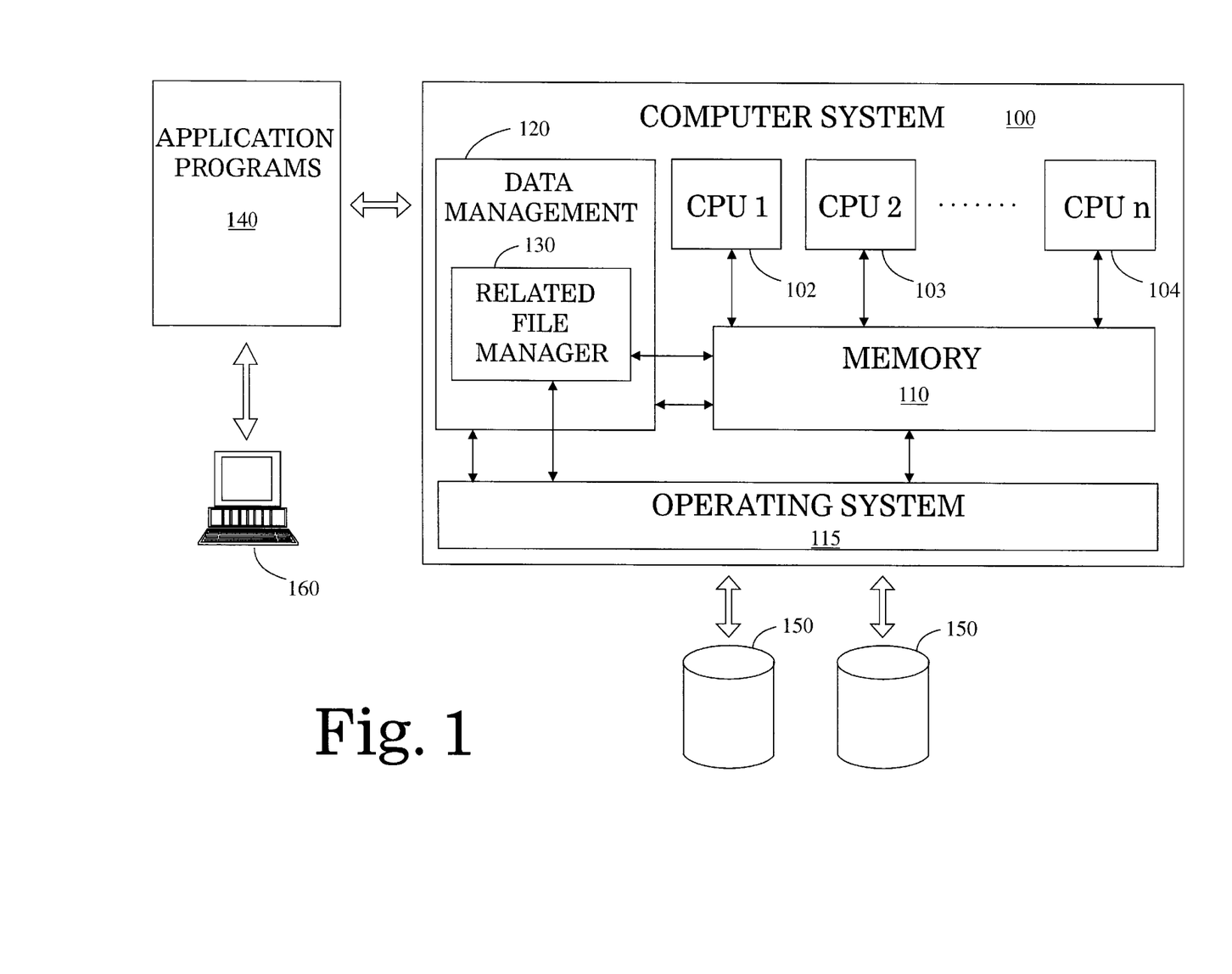
FIG. 1 is a block diagram of a typical computer system wherein the present invention may be practiced.

FIG. 1 is a block diagram of a computer system 100. Computer system 100 may comprise almost any digital data processing apparatus capable of processing data, such as a S/390 mainframe computer system, a personal computer, a workstation or another suitable machine. (S/390 is a registered trademark of International Business Machines Corporation in the United States, other countries, or both.) The hardware portions of the computer system 100 comprise one or more central processing units (CPUs) 102–104, memory 110, secondary storage volumes 150 together with associated I/O devices, device controllers, I/O channels, etc (not shown). The CPUs 102–104 suitably operate together in concert with memory 110 and operating system 115 in order to execute a variety of tasks. A layer of software, data management 120, runs on top of operating system 115 and serves to retrieve, manipulate and manage data in accordance with application program 140 requests. Data management 120 may comprise a relational data base manager, a hierarchical data base manager, an access method or any other software intended to store, retrieve, manipulate or manage data on behalf of a requester. End users 160 react with computer system 100 to perform useful data processing tasks in accordance with their needs. Those skilled in the art will recognize that various separately identified components of computer system 100 may be further integrated together or further separated into additional components. For example, data management 120 could be integrated with operating system 115 or application programs 140 may comprise an additional computer system 100.

Related file manager 130, a component of data manager 120, manages a set of related files. The term "file" as used herein refers to an organized set of data records that form an identifiable unit of data that resides on a storage device, or computer memory 110, or a combination of both. For example, the term "file" may refer to a set of employee records residing on disk storage 150, or other storage devices such as magnetic tape, writeable optical storage, or electronic flash memory (not shown). The term "file" may additionally refer to a table of employee records residing in computer memory 110.

Generally, related file manager 130 is tangibly embodied in and/or readable from a computer-readable medium containing the program code (or alternatively, computer instructions), which when read and executed by computer system 100 causes computer system 100 to perform the steps necessary to implement and/or use the present invention. Thus, the present invention may be implemented as a method, an apparatus, or an article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Examples of a computer readable device, carrier or media include, but are not limited to, palpable physical media such as a CD Rom, diskette, hard drive and the like, as well as other non-palpable physical media such as a carrier signal, whether over wires or wireless, when the program is distributed electronically.

Figure 2:
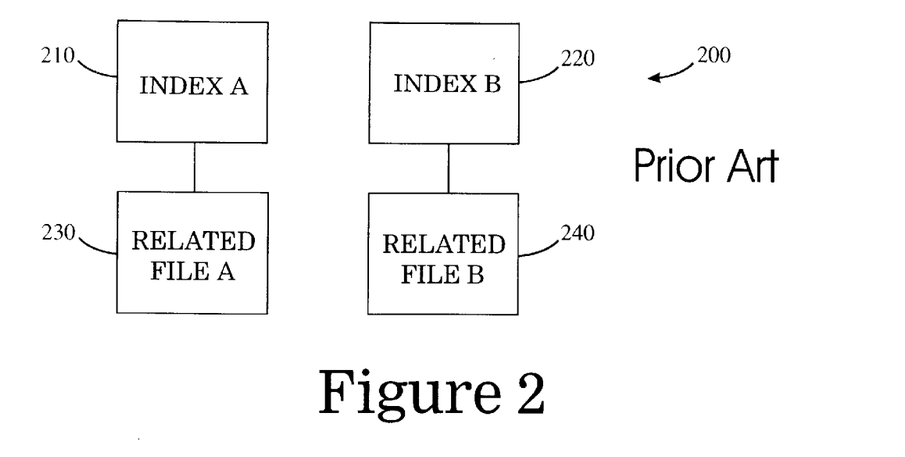
FIG. 2 shows a prior art organization of a pair of related files.

Referring now to FIG. 2, a pair of related files 230 and 240 are shown together with their associated indexes 210 and 220, respectively, as one example of related files in the prior art. Prior art related file managers are responsible for determining whether record retrievals, record inserts, record deletes or record updates should be directed to file A 230 or file B 240 and accordingly utilizing index A 210 or index B 220, respectively. Alternatively, prior art related file managers could utilize a single index (not shown); however, this is accomplished in the prior art by storing additional information within each index entry in order to further specify the particular one of a set of related files that contains the data record corresponding to a given data record pointer within an index entry. Increasing the size of index entries within an index may significantly degrade performance when performing search operations by prematurely increasing the number of levels within the index.

Figure 3:
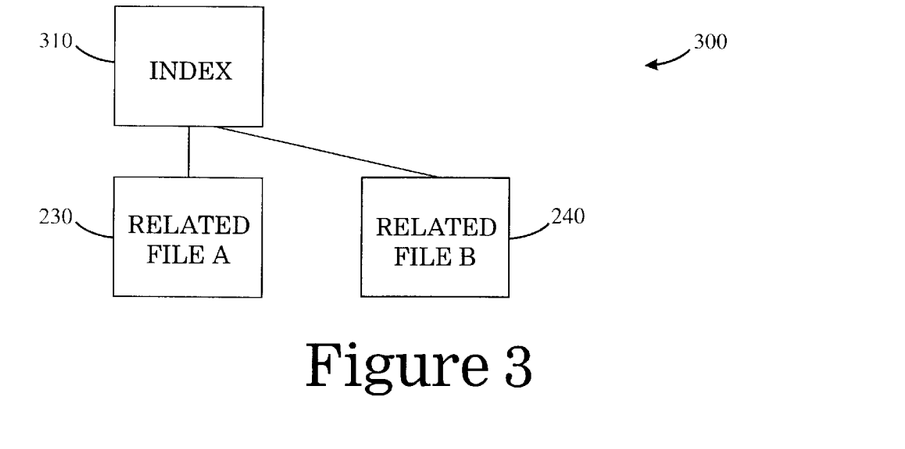
FIG. 3 shows an organization for a pair of related files in accordance with the present invention.

Referring now to FIG. 3, the same file A 230 and file B 240 are shown in accordance with the preferred embodiment. Index 310 is utilized to access data records from either file A 230 or file B 240 without requiring additional fields or information to be stored within index 310 to identify the particular file to be used. Therefore, index 310 accommodates requests directed to file A 230 or file B 240 without degrading performance related to an increase in index entry size and without requiring additional storage space to accommodate the use of an additional index.

Figure 4:
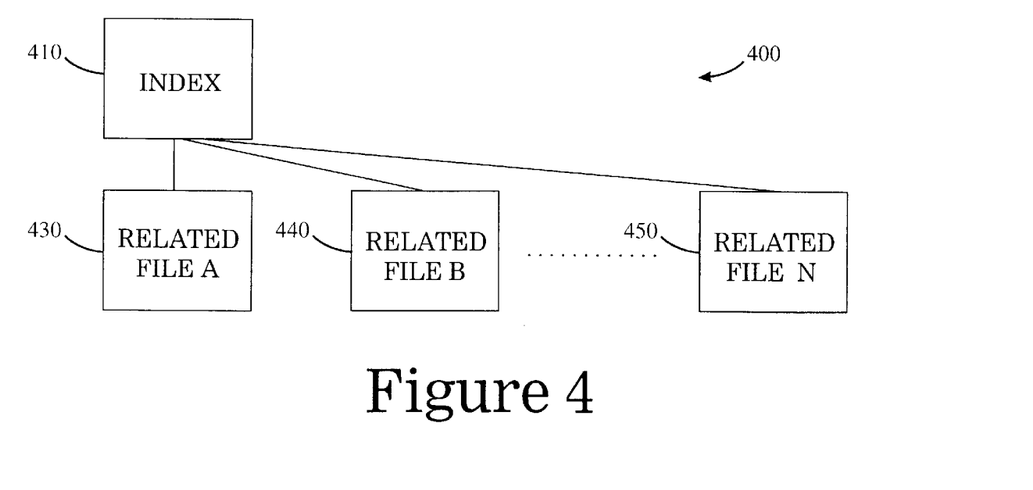
FIG. 4 shows an organization for a set of N related files in accordance with the present invention.

Referring now to FIG. 4, a set of N related files 430–450 are shown in accordance with the preferred embodiment. Index 410 is utilized to access data records from either file 1 (reference numeral 430), file 2 (reference numeral 440) or file N 450. Utilizing the novel techniques described below, the preferred embodiment provides for utilizing a single index to access data records residing in any number of related files without increasing the size of index 410. Accordingly, the potential performance degradation associated with increased index entry size is avoided and storage space requirements are reduced by eliminating the use of additional indexes to accommodate file 2 through file N.

Figure 5:
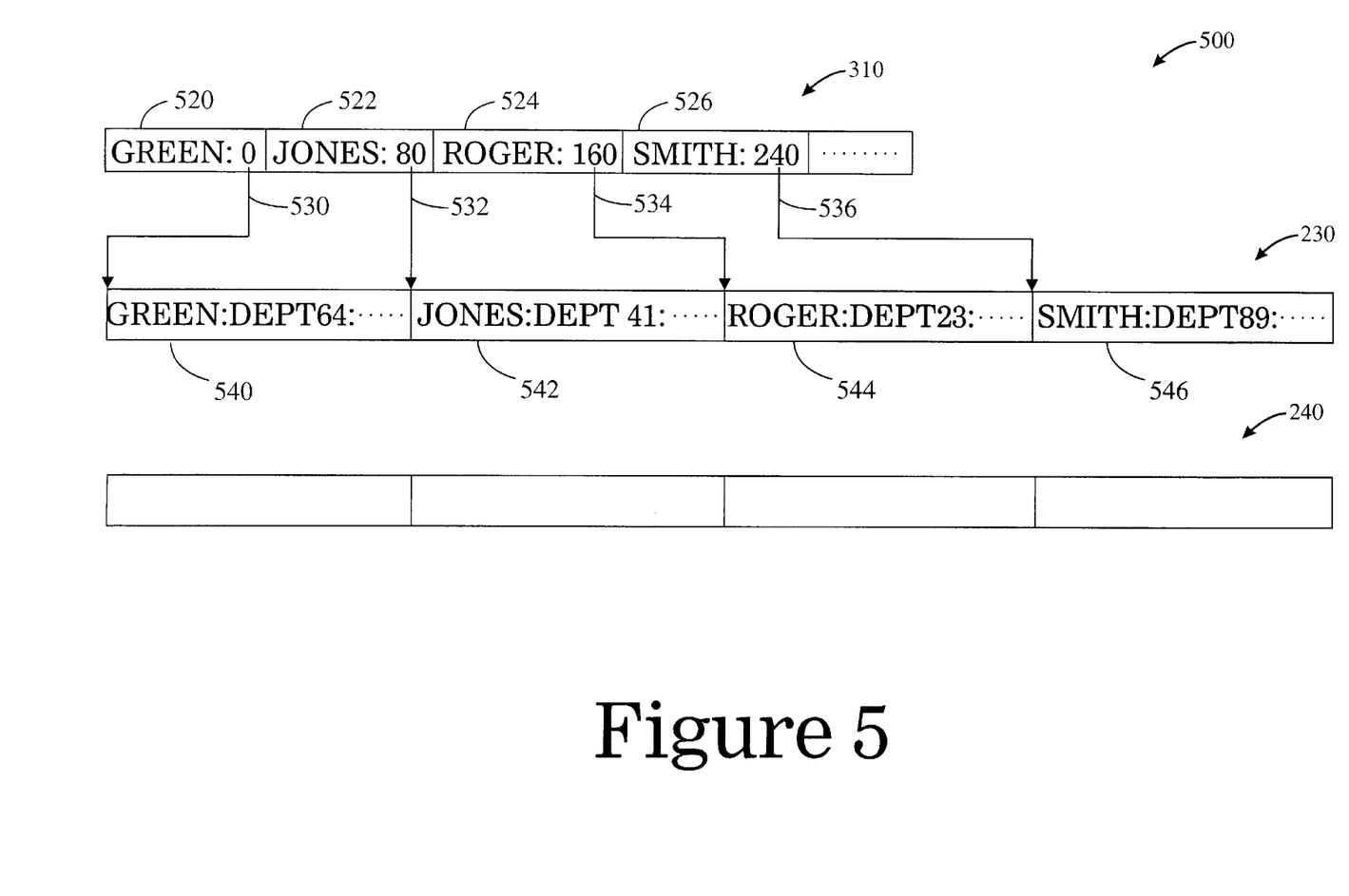
FIG. 5 shows a related file structure at one point in time in accordance with the present invention.

Referring now to FIG. 5, shown at one point in time, related file structure 500 comprises index 310, related file 230 and related file 240. Related file 240 is shown in the empty state, reflecting an initial condition wherein only a single version of each record exists. Related file 230 is shown with four exemplary employee records. The first record 540 for employee Green comprises a key portion consisting of the characters "GREEN" followed by a data portion which includes the corresponding employees department number and other employee data (not shown). In like manner employee records 542, 544 and 546 comprise key portions and data portions for employees Jones, Roger and Smith, respectively.

Index 310 enables fast access to data records within related files 230 and 240 wherein the key of a needed record can be searched for in index 310 and a corresponding data record pointer utilized to directly access the needed record. In this manner the needed record is directly accessed without having to sequentially search through all data records contained within related files 230 and 240. Index 310 comprises index entries 520, 522, 524, and 526. The first index entry 520 contains a key consisting of the characters "GREEN" followed by a data record pointer 530. Those skilled in the art will recognize that data record pointers may have one of many different forms. For example, a data record pointer may be an absolute address wherein the number of bytes are counted from the beginning of a storage device; or, alternatively, a data record pointer may be a relative address wherein the number of bytes are counted from the beginning of a file. The data record pointer of the latter example is referred to as a Relative Byte Address (RBA), which is a typical form of data record pointer in many data management components. Numerous other formats for data record pointers are possible, including composite data record pointers wherein one portion of the data record pointer specifies a physical hardware address, such as a track or cylinder, and the other portion specifies a logical location relative to the beginning of the specified physical hardware address. Those of ordinary skill in the art will appreciate that these and other data record pointer forms may be used without departing from the spirit and scope of the present invention.

Data record pointer 530 points to the exact beginning of employee Green's data record 540 and is therefore coincident with the data record address for data record 540. That is, independent of the form of the data record pointer, data record pointer 540 resolves to a location that represents the exact start of data record 540. In like manner each additional index entry 522, 524, and 526 contains a key and data record pointer wherein each key represents, and each data record pointer points to, its corresponding data record 542, 544, and 546, respectively. Since data record pointers 530–536 are each coincident with the address of data records 540–546, respectively, the preferred embodiment of the present invention determines that each data record pointer 530–536 points to a record within the first sequenced related file 230. When a data record pointer is not coincident with the exact beginning data record address, the preferred embodiment determines, as shown in greater detail below, that the corresponding data record resides in a related file other than the first sequenced related file 230.

Figure 6:
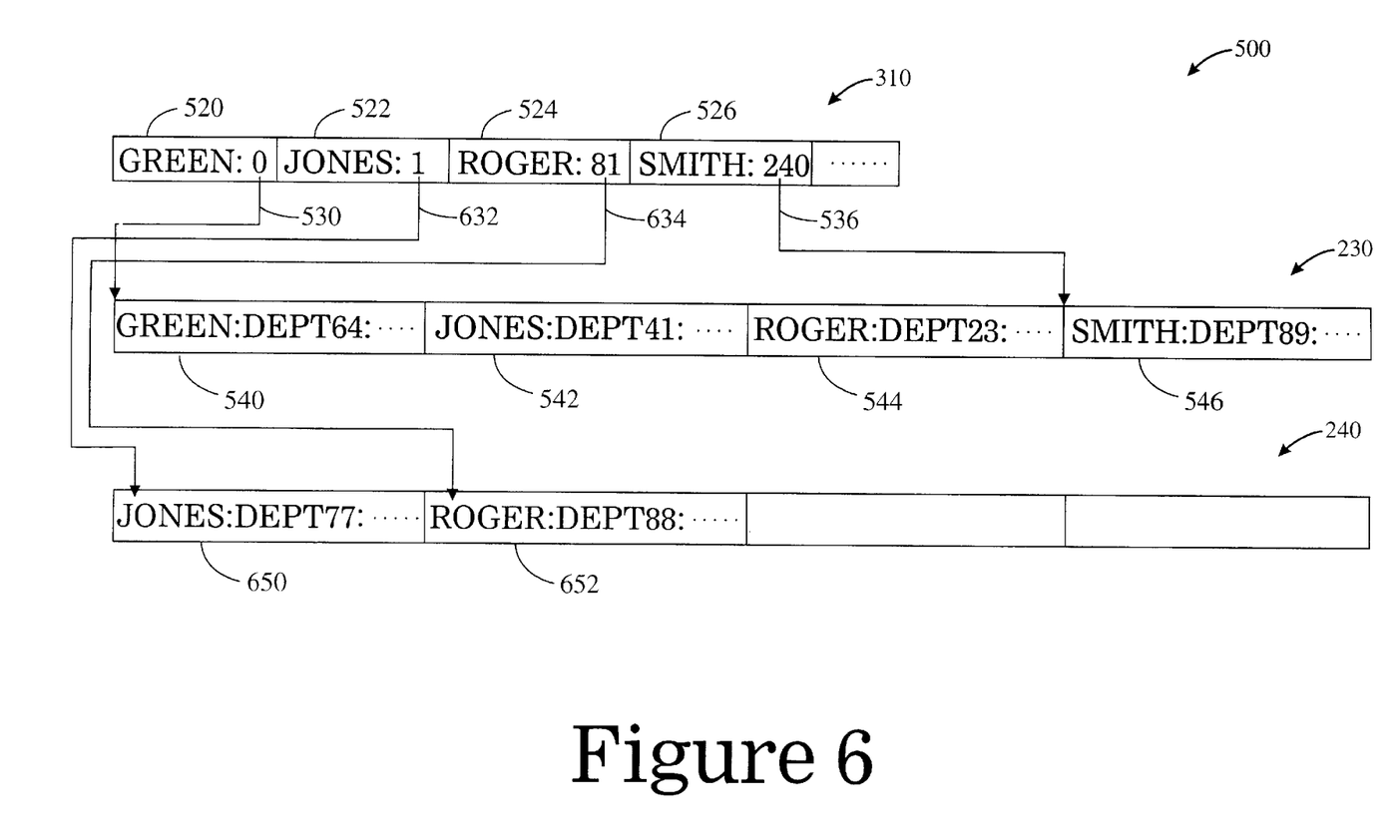
FIG. 6 shows a related file structure at another point in time in accordance with the present invention.

Referring now to FIG. 6, related file structure 500 is shown at a second point in time. Related file 240 has changed from the empty state to a non-empty state wherein data records 650 and 652 have been added. Data record 650 for employee Jones together with data record 542 for employee Jones forms a set of related data records. While there are potentially many reasons for creating related records, as explained supra, in this example it is evident that the department number for employee Jones has been changed from department 41, in data record 542, to department 77 in data record 650; accordingly the new version (data record 650) is created using the previous version (data record 542) as the source record upon which to incorporate the change in departments. Data record 542 within related file 230 and data record 650 within related file 240 together comprise a set of related data records wherein data record 650 contains the current information for employee Jones and data record 542 contains the previous information for employee Jones.

In like manner, Data record 652 for employee Roger together with data record 544 for employee Roger forms a set of related data records. The department number for employee Roger has been changed from department 23, in data record 544, to department 88 in data record 652; accordingly the new version (data record 652) is created using the previous version (data record 544) as the source record upon which to incorporate the change in departments. Data record 544 within related file 230 and data record 652 within related file 240 together comprise a set of related data records wherein data record 652 contains the current information for employee Roger and data record 544 contains the previous information for employee Roger. Those of ordinary skill in the art will recognize that the departmental changes are exemplary and, as explained briefly above, there are many reasons why multiple related records may coexist. Examples include data availability, concurrent access to data during reorganization, multiple record versions, etc.

Index entry 520 for employee Green has not changed from the previous state depicted in FIG. 5 and the data record pointer 530 within index entry 520 continues to point to data record 540 and continues to be coincident with the data record address for employee Green. Index entry 522 for employee Jones has been changed in a significant way to reflect the departmental change for employee Jones and, accordingly, to reflect the new target file 240, that contains the current record 650. The preferred embodiment determines that the data record pointer 632 is pointing to the data record 650, representing the current record for employee Jones, within the second sequenced related file 240, through the use of the novel technique explained below.

The preferred embodiment computes a modulus for data record pointer 632 divided by the number of related files in the set of related files. The exemplary related file structure 500 contains two related files 230 and 240. Therefore, data record pointer 632, containing an RBA of 1 is divided by 2 (the number of related files in the set of related files) which produces a modulus of 1. This modulus of 1 signifies that the target file for this data record pointer 632 is the second sequenced related file 240. In like manner, data record pointer 634, containing an RBA of 81 is divided by 2 (the number of related files in the set of related files) which produces a modulus of 1, also reflecting the second sequenced related file 240 as the target file. Continuing with data record pointer 536 within data record 526, the RBA value 240 is divided by 2 producing a modulus of zero. The modulus of zero for data record pointer 536 signifies that the target file is first sequenced related file 230.

It will be apparent to those of ordinary skill in the art that the modulus may be computed in a variety of ways. For example, a computer divide operation may by utilized, or a series of computer subtraction operations may be performed. Register shifting operations and logical operator operations are also known in the art and may be deployed in various ways to produce the modulus discussed above.

Figure 7:
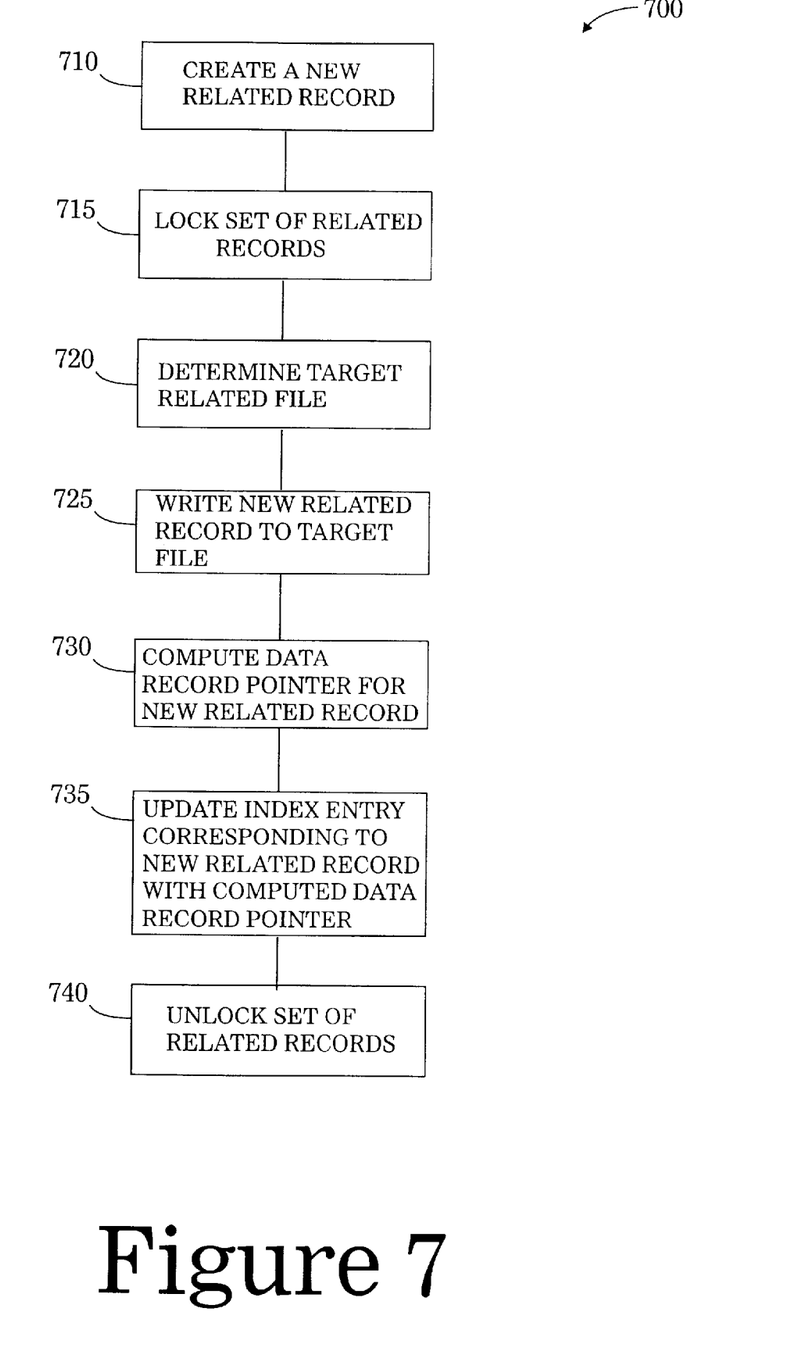
FIG. 7 is a flow diagram in accordance with one aspect of the present invention.

Referring now to FIG. 7, in conjunction with FIG. 5 and FIG. 6, flow diagram 700 shows the preferred embodiment steps for creating a new related record. Although exemplary related file structure 500 contains only two related files, flow diagram 700 provides for any number of related files to exist within the set of related files. First, in step 710, the new record to be added to the related file structure 500 is created utilizing information from previous versions of the data record. Then, in step 715, the set of related records including the new record to be added is locked to prevent access to these related records until after the new record is added to related file structure 500 and all details associated with the add process are complete. Those skilled in the art will recognize that a variety of techniques are known in the art to lock out portions of file structure 500 from access until certain critical operations have been completed. It is further known in the art how to make these critical operations atomic, wherein a set of critical operations are either completed in their entirety or no aspect of the set of critical operations are completed at all.

Continuing with step 720, the target file for the new data record is determined. Typically, the target file for the new record is the next sequenced file in the set of related files following the related file that contains the most current data record prior to the creation of the new data record. Then, in step 725, the new data record is written to the target file, and to a particular location within the target file identified by a data record address Those skilled in the art will recognize that a data record, written to a particular location within a target file, will have an associated data record address, and that this data record address may have many different formats. This data record address is utilized, in step 730, to compute a data record pointer for the new data record. If the target file is the first related file within the set of related files, then the data record pointer is set to be coincident with the data record address. If the target file is the second related file within the set of related files, then the data record pointer is set to be one addressable unit higher than the data record address. (In exemplary related file structure 500, the addressable units are bytes of data; however, many other addressable units are possible, such as words of data, double bytes, etc.) If the target file is the $n^{th}$ related file, then the data record pointer is set to be n−1 addressable units higher than the data record address.

The proper operation of preferred embodiment step 730 is dependent upon adhering to a limitation regarding the location of data records. This limitation requires that the data record address of every record within a related file structure is an even multiple of the number of related files within the set of related files. For example, the exemplary related file structure 500 must enforce the limitation that each data record within the structure has a data record address that is an even multiple of 2, since there are 2 related files in the set of related files.

Continuing with step 735, the index entry corresponding to the new related record is updated with the computed data record pointer determined from step 730 above. Finally, in step 740, the set of related data records is unlocked and, accordingly, the newly created data record may be accessed.

Figure 8:
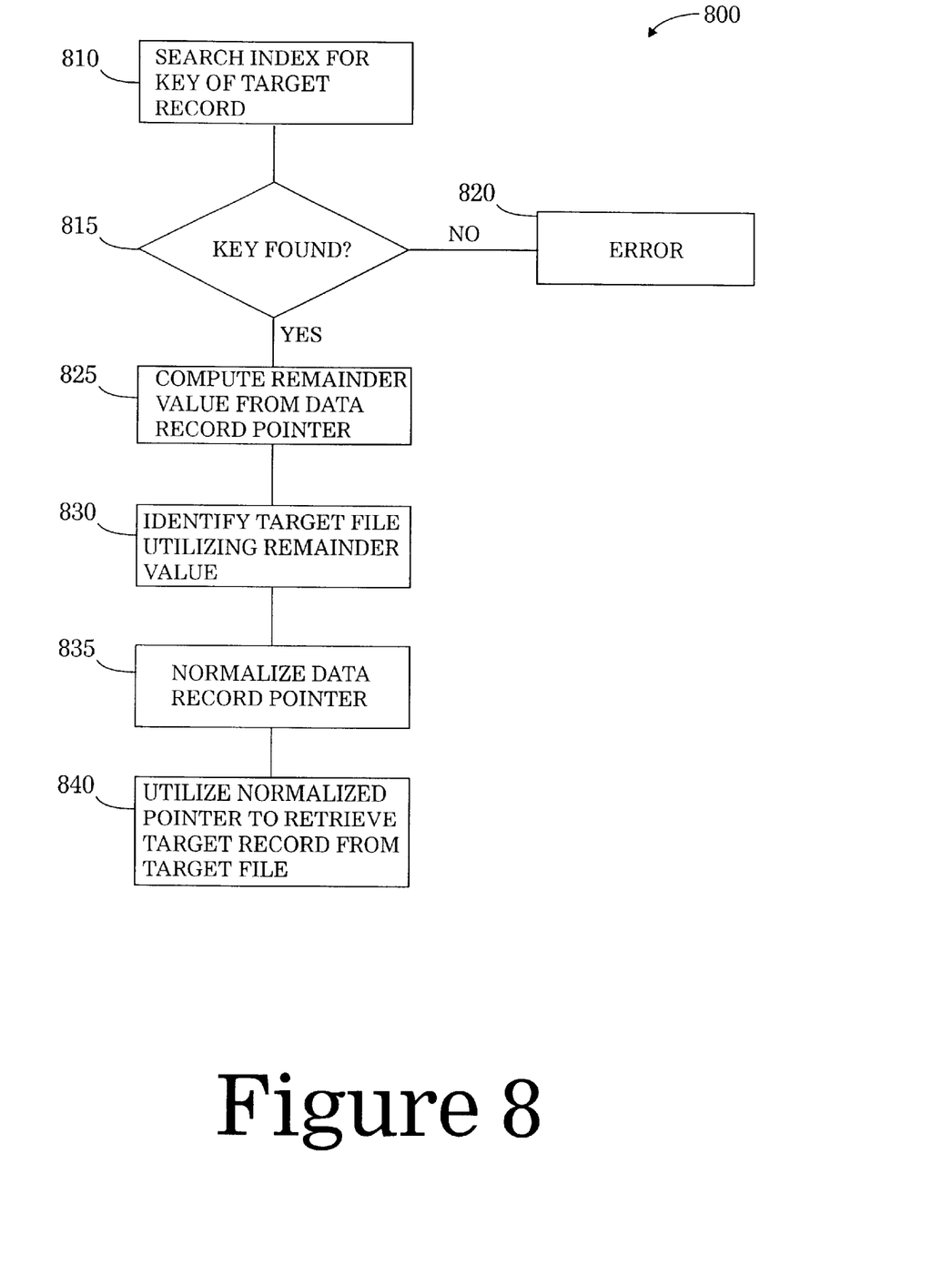
FIG. 8 is a flow diagram in accordance with another aspect of the present invention.

Referring now to FIG. 8, in conjunction with FIG. 5 and FIG. 6, flow diagram 800 shows the preferred embodiment steps for accessing a related data record from a set of related files. Although exemplary related file structure 500 contains only two related files, flow diagram 800 provides for any number of related files to exist within the set of related files. First, in step 810, the index component of a related file structure is searched utilizing the key of the target data record. Then, in step 815, it is determined whether or not an index entry associated with the key of the target data record is found. If the index entry was not found, an error condition is generated in step 820 reflecting that the target data record does not exist. If the index entry was found, then processing continues with step 825 wherein a modulus is computed utilizing the data record pointer from the found index entry divided by the number of related files in the set of related files. Those skilled in the art, as previously explained above, will recognize that this computation may be performed in a variety of ways, such as division, repeated subtraction, modulo operators, register shifting and logical binary operations. Independent of the method used to produce the modulus, the same modulus value is achieved for any given data record pointer.

Processing continues with step 830 wherein the modulus is utilized to determine which related file, from the set of related files, is the target file associated with the data record pointer from which the modulus was derived. If the modulus is zero, then the target file is the first related file within the set of related files. If the modulus is n−1, the target file is the $n^{th}$ related file within the set of related files. Those skilled in the art will recognize that the computed modulus can be utilized in a variety of ways to select the target file. For example, a modulus of 0 could correspond to the $N^{th}$ sequenced related file and a modulus of N could correspond to the first sequenced related file. Various other functions and formulas utilizing a computed modulus could be used to establish a one-to-one correspondence between a modulus value and a particular one of a set of related files, as long as the method used to establish the one-to-one correspondence is consistent for both the creation of data record pointers and the use of data record pointers.

Continuing with step 835, the data record pointer is normalized to determine the data record address of the target data record within the target file determined from step 830 above. This normalization process produces a data record address by computing a value that represents the result of subtracting the computed modulus from step 825 above from the data record pointer. Those skilled in the art will recognize that a variety of types of computations may be performed to accomplish the normalization process, but the desired result is well defined from the subtraction process defined above. For example, when the set of related files comprises 2 files, the data record address within the target file can be derived from the data record pointer by logically ANDing a first operand of 0 with the last bit of the data record pointer as the second operand. This process is logically equivalent to subtracting a modulus (either zero or one) from the data record pointer.

The proper operation of preferred embodiment steps 830 and 835 above is dependent upon adhering to a limitation regarding the location of data records. This limitation requires that the data record address of every record within a related file structure is an even multiple of the number of related files within the set of related files. For example, the exemplary related file structure 500 must enforce the limitation that each data record within the structure has a data record address that is an even multiple of 2.

Finally, in step 840, the normalized data record pointer computed from step 835 above is utilized as the data record address to retrieve the target data record from the target file determined from step 830 above. Taken in combination the flow diagrams 700 and 800, shown in FIGS. 7 and 8, respectively, provide for improved utilization of storage and improved search performance in a data processing environment comprising multiple related files.

References in the claims to an element in the singular is not intended to mean "one and only" unless explicitly so stated, but rather "one or more." All structural and function equivalents to the elements of the above-described exemplary embodiment that are currently known or later come to be known to those of ordinary skill in the art are intended to be encompassed by the present claims. No claim element herein is to be construed under the provisions of 35 U.S.C. § 112, sixth paragraph, unless the element is expressly recited using the phrase "means for" or "step for."

While the preferred embodiment of the present invention has been described in detail, it will be understood that modification and adaptations to the embodiment(s) shown may occur to one of ordinary skill in the art without departing from the scope of the present invention as set forth in the following claims. Thus, the scope of this invention is to be construed according to the appended claims and not just to the specific details disclosed in the exemplary embodiments.

What is claimed:

1. A method for accessing, on a computer system, a target data record located through a single index encompassing a set of N related files wherein said index comprises a fuzzy data record pointer, said method comprising the steps of:
   (a) computing a modulus for said fuzzy data record pointer divided by N;
   (b) utilizing said modulus to select a target file from said set of N related files;
   (c) computing a data record address for said target data record in said target file utilizing said fuzzy data record pointer and said modulus; and
   (d) accessing said target data record from said target file utilizing said data record address.

2. The method of claim 1 wherein said computing step (c) comprises subtracting said modulus from said fuzzy data record pointer.

3. The method of claim 1 wherein said modulus is 0 and said target file is the first sequenced file from said set of N related files.

4. The method of claim 1 wherein said modulus is N−1 and said target file is the $N^{th}$ sequenced file from said set of N related files.

5. The method of claim 4 wherein N equals 2.

6. The method of claim 1 wherein said fuzzy data record pointer is a Relative Byte Address.

7. The method of claim 1 wherein said target file is a VSAM data set.

8. The method of claim 1 further comprising:
   (e) creating in a second related file selected from said set of N related files a new data record corresponding to said target data record within said target file;
   (f) determining a second data record address for said new data record within said second related file; and
   (g) computing a second fuzzy data record pointer for use within said index utilizing said second data record address.

9. The method of claim 8 wherein said computing step (g) comprises adding an integer to said second data record address wherein said integer is within the range of 0 to N−1.

10. The method of claim 8 wherein said index is utilized to retrieve data records from said set of N related files.

11. The method of claim 10 wherein said set of N related files comprise at least a portion of an IMS data base.

12. A computer system for accessing a target data record located through a single index encompassing a set of N related files wherein said index comprises a fuzzy data record pointer, said computer system comprising:
   (a) a computer;
   (b) computer program first instructions, executed by said computer, for computing a modulus for said fuzzy data record pointer divided by N;
   (c) computer program second instructions, executed by said computer, for utilizing said modulus to select a target file from said set of N related files;
   (d) computer program third instructions, executed by said computer, for computing a data record address for said target data record in said target file utilizing said fuzzy data record pointer and said modulus; and
   (e) computer program fourth instructions, executed by said computer, for accessing said target data record from said target file utilizing said data record address.

13. The system of claim 12 wherein said computer program third instructions subtract said modulus from said fuzzy data record pointer.

14. The system of claim 12 wherein said modulus is 0 and said target file is the first sequenced file from said set of N related files.

15. The system of claim 12 wherein said modulus is N−1 and said target file is the $N^{th}$ sequenced file from said set of N related files.

16. The system of claim 15 wherein N equals 2.

17. The system of claim 12 wherein said fuzzy data record pointer is a Relative Byte Address.

18. The system of claim 12 wherein said target file is a VSAM data set.

19. The system of claim 12 further comprising:
   (f) computer program fifth instructions, executed by said computer, for creating in a second related file, selected from said set of N related files, a new data record corresponding to said target data record within said target file;
   (g) computer program sixth instructions, executed by said computer, for determining a second data record address for said new data record within said second related file; and (h) computer program seventh instructions, executed by said computer, for computing a second fuzzy data record pointer for use within said index utilizing said second data record address.

20. The system of claim 19 wherein said computer program seventh instructions add an integer to said second data record address wherein said integer is within the range of 0 to N−1.

21. The system of claim 19 wherein said index is utilized to retrieve data records from said set of N related files.

22. The system of claim 21 wherein said set of N related files comprise at least a portion of an IMS data base.

23. An article of manufacture for use in a computer system tangibly embodying a program of instructions executable by said computer system to perform method steps for accessing a target data record located through a single index encompassing a set of N related files wherein said index comprises a fuzzy data record pointer, said method comprising the following steps:

(a) computing a modulus for said fuzzy data record pointer divided by N;

(b) utilizing said modulus to select a target file from said set of N related files;

(c) computing a data record address for said target data record in said target file utilizing said fuzzy data record pointer and said modulus; and (d) accessing said target data record from said target file utilizing said data record address.

24. The article of manufacture of claim 23 wherein said computing step (c) comprises subtracting said modulus from said fuzzy data record pointer.

25. The article of manufacture of claim 23 wherein said modulus is 0 and said target file is the first sequenced file from said set of N related files.

26. The article of manufacture of claim 23 wherein said modulus is N−1 and said target file is the $N^{th}$ sequenced file from said set of N related files.

27. The article of manufacture of claim 23 further comprising:

(e) creating in a second related file selected from said set of N related files a new data record corresponding to said target data record within said target file;

(f) determining a second data record address for said new data record within said second related file; and (g) computing a second fuzzy data record pointer for use within said index utilizing said second data record address.

28. The article of manufacture in accordance with claim 27 wherein said computing step (g) comprises adding an integer to said second data record address wherein said integer is within the range of 0 to N−1.

29. The article of manufacture of claim 27 wherein said set of N related files comprise at least a portion of an IMS data base.

* * * * *